(12) United States Patent
Shibuya (10) Patent No.: US 8,559,058 B2
(45) Date of Patent: Oct. 15, 2013

(54) IMAGE PROCESSING APPARATUS, IMAGE PROCESSING METHOD, AND COMPUTER PROGRAM PRODUCT

(75) Inventor: Takeshi Shibuya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 303 days.

(21) Appl. No.: 13/067,536

(22) Filed: Jun. 8, 2011

(65) Prior Publication Data

US 2011/0304863 A1 Dec. 15, 2011

(30) Foreign Application Priority Data

Jun. 15, 2010 (JP) .................................. 2010-136358
Apr. 11, 2011 (JP) .................................. 2011-087615

(51) Int. Cl.
*G06F 15/00* (2006.01)
*G03F 3/08* (2006.01)

(52) U.S. Cl.
USPC ........................................... 358/1.9; 358/518

(58) Field of Classification Search
USPC ............ 358/1.9, 518, 521, 527, 529; 382/167
See application file for complete search history.

(56) References Cited

U.S. PATENT DOCUMENTS

| 2002/0083852 A1 | 7/2002 | Degani et al. |
| 2003/0214686 A1 | 11/2003 | Saito et al. |
| 2005/0129307 A1 | 6/2005 | Hasegawa |
| 2007/0064043 A1* | 3/2007 | Tsuchiya et al. ................. 347/19 |
| 2008/0253783 A1 | 10/2008 | Kuo et al. |
| 2010/0183223 A1* | 7/2010 | Matsuoka ..................... 382/166 |
| 2012/0038688 A1* | 2/2012 | Deyama et al. .............. 345/690 |

FOREIGN PATENT DOCUMENTS

| JP | 2005210225 A | 8/2005 |
| JP | 4086442 A | 2/2008 |
| JP | 4135599 A | 6/2008 |
| JP | 2008153810 A | 7/2008 |

OTHER PUBLICATIONS

Abstract of Japanese Patent Publication No. JP2005-080045, published on Mar. 24, 2005.
Abstract of Japanese Patent Publication No. JP2001-186368, published on Jul. 6, 2001.
European Search Report dated Apr. 24, 2013.

* cited by examiner

*Primary Examiner* — Jerome Grant, II
(74) *Attorney, Agent, or Firm* — Harness, Dickey & Pierce, P.L.C.

(57) ABSTRACT

An image forming apparatus outputs a proof chart in response to an instruction for calibration execution from a user and then a color measuring unit measures the colors of patches on the proof chart. A profile management unit selects, from entries in a base profile DB, a base profile in an entry that has color reproduction characteristics that are closest to the color measurement values of the patches and generates a sheet correction TRC that has an approximation to the color measurement values of the patches when the selected base profile is used. The selected base profile is used as a color conversion parameter in a color management module, and the generated sheet correction TRC is used as a tone correction parameter in a sheet-corresponding correcting unit.

8 Claims, 5 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-136358 filed in Japan on Jun. 15, 2010 and Japanese Patent Application No. 2011-87615 filed in Japan on Apr. 11, 2011.

BACKGROUND OF THE INVENTION

1. Field of the Invention

The present invention relates to an image processing apparatus, an image processing method, and a computer program product for performing image processing to achieve uniform color reproduction by an image forming apparatus.

2. Description of the Related Art

For an image forming apparatus, such as a color printer, color copier, or color printing machine, that forms color images on an image recording medium by using digital data on the basic colors CMYK, and the like, image processing called color management is performed on input data in the image forming apparatus in order to achieve uniform color reproduction. For color management, the color management framework proposed by the International Color Consortium (ICC) and its data format, ICC profile, are widely known.

As is the case with ICC profiles, often in color management for printing system with high nonlinearity, the basic unit of conversion is made up of a combination of a multidimensional look up table (LUT) that associates an input color space with an output color space and a one-dimensional LUT that linearizes input and output thereof for respective channels of CMYK colors, and the like. The one-dimensional LUT for an input/output channel is called a TRC, which means tone reproduction curve or tone response correction. A TRC does not always need to be implemented as an LUT; however, in many cases, it is implemented as an LUT because of its simplicity of implementation and versatility.

The ICC framework provides, for the color conversion as described above, a method in which one color space is converted to another color space through a device-independent color space called a profile connection space (PCS) and a method (called a device link) of direct mapping not through a PCS using a TRC of an input/output channel and a multidimensional LUT. In the ICC, a color space of a CIE1976Lab color system or CIE1931XYZ color system is used as a PCS or its subspace is used. In the following descriptions, data that stores a TRC of an input/output channel and a multidimensional LUT used to perform color conversion between channels as described above, not only that of the ICC, is referred to as a color profile or simply as a profile. (According to the definition of the present specifications, the ICC profile format is a package of a plurality of profiles in accordance with rendering intent and conversion direction.)

In the color management framework as described above, an image forming apparatus, which supports, as image forming targets, a plurality of types of print sheets or a plurality of types of media (image recording media), needs a different color profile for each medium with different color reproduction characteristics. Furthermore, even for media with the same color reproduction, there is a need for profiles that are adjusted according to print conditions, such as the number of halftone dot lines, the type of content, such as a character, graphic, or photo, or compression intent of a color gamut; therefore, the required number of profiles tends to be large in response to the requirements of customers who wants to deal with a variety of media. In terms of cost and management, it is difficult for a maker who offers image forming apparatuses to provide profiles that adapt to all media and output conditions. Thus, a maker provides profiles corresponding to some typical media and some typical output conditions and leaves to customers the creation of profiles corresponding to other media and other conditions.

For the creation of profiles, although constructing a color reproduction model that is mapping from a device color space to a PCS is relatively easy, mapping in the opposite direction from a PCS to a device color space (a color space with CMYK parameters in most image forming apparatuses) is technically difficult because it includes an unstable process of corresponding a color outside the color gamut irreproducible by the device with a reproducible color inside the color gamut and therefore an unexpected defect can easily occur on the constructed mapping. Such a mapping defect is likely to occur in adjustment to reflect, in particular, user's preference on a reproduced color, and this is the factor that requires a certain amount of experience.

Conventional methods disclosed in, for example, Japanese Patent Application Laid-open No. 2008-153810, Japanese Patent No. 4086442, and Japanese Patent No. 4135599 are proposed to solve the problem of the increasing number of profiles corresponding to a variety of media as described above. Japanese Patent Application Laid-open No. 2008-153810 discloses the idea that a sheet of paper whose characteristics are close to those of a user' sheet of paper is selected from regular sheets of paper whose characteristics are already known and conversion data on image data is combined by using it. Japanese Patent No. 4086442 discloses a method of sheet adaptation in which linear transformation is performed on the input RGB side. Specifically, it discloses that a unit which performs RGB to RGB conversion in an input space so as to correct a difference depending on a medium is provided as a media converting unit and that an affine transform matrix is used as a correcting unit in the above case. Japanese Patent No. 4135599 discloses a method of reducing, by using a sheet difference correction curve, a reproduction color difference between images output from different image output apparatuses using sheets of paper of different white color.

The technology disclosed in Japanese Patent Application Laid-open No. 2008-153810 is a method to generate conversion data for device-link type RGB to CMYK conversion for a user's sheet of paper. The conversion data is generated by a combination of RBG to CMYK conversion for a known regular sheet of paper, CMYK to PCS conversion for the same regular sheet of paper, and PCS to CMYK conversion for a user's sheet of paper. Thus, it is essential for the combination to separately obtain a profile for a user's sheet of paper, especially PCS to CMYK conversion for which generation requires experience as described above; therefore, the user's difficulty for constructing profiles are not essentially resolved.

The method of sheet adaptation disclosed in Japanese Patent No. 4086442 is based on the assumption that the color reproduction characteristics between the sheets of paper for which conversion is performed are close enough to each other; therefore, there is a problem in that the method cannot be applied if there is a significant color gamut difference therebetween or if a nonlinear relation occurs therebetween such that they cannot be adequately approximated to each other by affine transformation.

In the method disclosed in Japanese Patent No. 4135599, first, a reproduced color in a PCS (a Lab space) of a first image output apparatus using a reference sheet of paper is made to correspond with a reproduction color value in a PCS of a second image output apparatus by cyclically undergoing PCS to CMYK to PCS and using a profile of the second image output apparatus for a target sheet of paper, and in order to reduce any error between the reproduction color value and a reproduction color value in the PCS of the first image output apparatus, tone value correction is performed on input CMYK values with respect to the reproduction color value of the first image output apparatus. In this case, mapping between the PCS and the CMYK device spaces as described above functions as mapping for color gamut compression that makes an arbitrary point in the PCS with a point within the color gamut of the second image output apparatus. Therefore, in this case, too, it is essentially necessary to prepare in advance a profile that includes PCS to CMYK conversion on the second image output apparatus side for the user's sheet of paper, and in addition, the sheet correction thus obtained causes the color gamut of the second image output apparatus to be limited to the range that is common with the color gamut of the first image output apparatus. This causes a problem in that the practical color gamut becomes small especially when a large variety of sheets of paper is to be handled.

SUMMARY OF THE INVENTION

It is an object of the present invention to at least partially solve the problems in the conventional technology.

According to an aspect of the present invention, there is provided an image processing apparatus that performs image processing to achieve uniform color reproduction on various types of image formation media by an image forming apparatus. The image forming apparatus forms a color image on an image formation medium by superimposing a plurality of basic colors. The image processing apparatus includes a database that stores therein a plurality of color conversion parameters; a color converting unit that converts, by using a color conversion parameter that is selected from the plurality of color conversion parameters stored in the database, either device-dependent color values of another device different from the image forming apparatus or device-independent color values into color values that correspond to basic colors of the image forming apparatus; a medium-corresponding correcting unit that corrects, by using a tone correction parameter, tone characteristics of the respective basic colors of the image forming apparatus to correspond with an image formation medium to be used by the image forming apparatus; and a user interface that receives a user's operation that instructs a calibration to start. Through the calibration started according to the user's operation by using the user interface, the color conversion parameter to be used by the color converting unit is automatically selected from the plurality of color conversion parameters stored in the database, and the tone correction parameter to be used by the medium-corresponding correcting unit is generated.

According to another aspect of the present invention, there is provided a method of image processing performed to achieve uniform color reproduction on various types of image formation media by an image forming apparatus. The image forming apparatus forms a color image on an image formation medium by superimposing a plurality of basic colors. The method includes causing the image forming apparatus to output a proof chart that is made up of a plurality of patches formed on an image formation medium; measuring colors of the patches on the proof chart output from the image forming apparatus; selecting, from a plurality of color conversion parameters pre-stored in a database, a color conversion parameter that has color reproduction characteristics closest to color measurement values of the measured patches; generating a tone correction parameter that has an approximation to the color measurement values of the patches when the selected color conversion parameter is used; converting, by using the selected color conversion parameter, either device-dependent color values of another device different from the image forming apparatus or device-independent color values into color values that correspond to basic colors of the image forming apparatus; and correcting, by using the generated tone correction parameter, tone characteristics of the respective basic colors of the image forming apparatus to correspond with an image formation medium to be used by the image forming apparatus.

According to still another aspect of the present invention, there is provided a computer program product including a non-transitory computer-readable medium having computer-readable program codes embodied in the medium for image processing performed to achieve uniform color reproduction on various types of image formation media by an image forming apparatus. The image forming apparatus forms a color image on an image formation medium by superimposing a plurality of basic colors. The program codes when executed causes a computer to execute causing the image forming apparatus to output a proof chart that is made up of a plurality of patches formed on an image formation medium; measuring colors of the patches on the proof chart output from the image forming apparatus; selecting, from a plurality of color conversion parameters pre-stored in a database, a color conversion parameter that has color reproduction characteristics closest to color measurement characteristic values of the measured patches; generating a tone correction parameter that has an approximation to the color measurement values of the patches when the selected color conversion parameter is used; converting, by using the selected color conversion parameter, either device-dependent color values of another device different from the image forming apparatus or device-independent color values into color values that correspond to basic colors of the image forming apparatus; and correcting, by using the generated tone correction parameter, tone characteristics of the respective basic colors of the image forming apparatus to correspond with an image formation medium to be used by the image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of an image processing apparatus, an image processing method, and a computer program product according to the present invention are explained in detail below with reference to the accompanying drawings.

Figure 1:
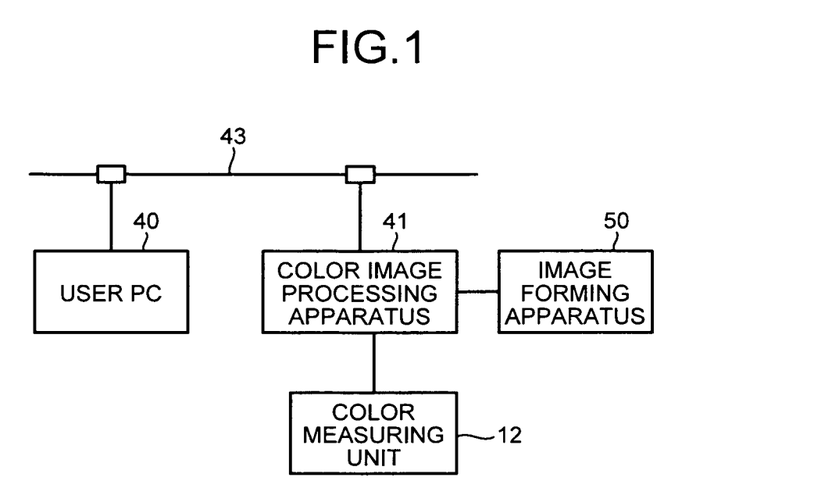
FIG. 1 is a configuration diagram of an image forming system that includes a color image processing apparatus according to an embodiment.

FIG. 1 is a configuration diagram of an image forming system that includes a color image processing apparatus according to the present embodiment. A color image processing apparatus 41 according to the present embodiment is implemented using a control PC and expansion hardware and control software that are mounted on the control PC.

The color image processing apparatus 41 is connected to an image forming apparatus 50 that forms images on a sheet, which is a physical image formation medium, by using image signals processed by the color image processing apparatus 41. The image forming apparatus 50 uses four colors, cyan (C), magenta (M), yellow (Y), and black (K) as basic color materials and forms full-color images on a sheet of paper by mixing these colors.

The color image processing apparatus 41 is connected to a network 43. The color image processing apparatus 41 receives data on originals that is sent from a user PC 40 connected to the network 43, performs an image processing process that is described later, and then sends the processed data to the image forming apparatus 50.

The color image processing apparatus 41 is connected to a color measuring unit 12 that is used for calibration and color reproduction characteristics measurement of the image forming apparatus 50. A spectrophotometer is used as the color measuring unit 12; however, a color scanner can be alternatively used in a simpler configuration.

Figure 2:
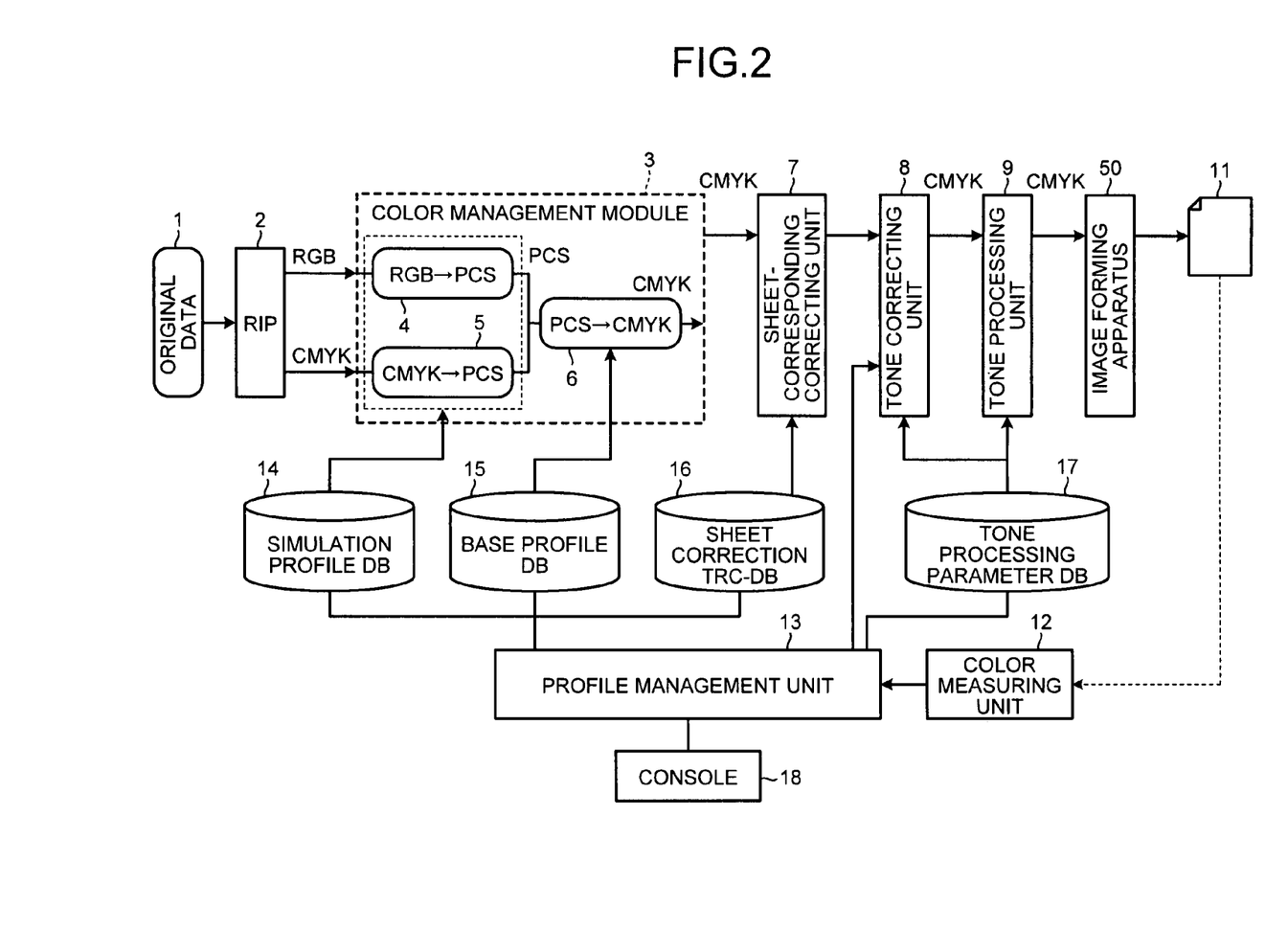
FIG. 2 is a functional block diagram that illustrates the outline of an image processing process performed by the color image processing apparatus according to the embodiment.

FIG. 2 is a functional block diagram that illustrates the outline of an image processing process performed by the color image processing apparatus 41. An explanation is given below of the outline of the image processing process performed by the color image processing apparatus 41 with reference to FIG. 2.

Original data 1 that is input to the color image processing apparatus 41 is first developed by a raster image processor (RIP) 2 into a bitmap where attribute information is added to color signals for each pixel in RGB or CMYK. Here, the attribute information includes, for example, information indicating which object of a character, photograph, and graphic a pixel belongs to. Most processing parameters, those for the RIP 2 and subsequent units, are changed depending on the attribute information. A process is performed on a pixel-by-pixel basis; therefore, part about object switching is omitted from FIG. 2 for ease of explanation. For software implementation, the processes from a color management module 3 to a tone processing unit 9 may be branched depending on the attribute information and, for hardware implementation, the processes from the color management module 3 to the tone processing unit 9 with different settings may be performed in parallel and signals are selected at the gate of the image forming apparatus 50 depending on the attribute information so that the object switching can be performed.

In the subsequent color management module 3, color values in a device-dependent color space for RGB, CMYK, or the like is converted into color values in a CMYK color space, which is the basic colors of the image forming apparatus 50, via a PCS that is a device-independent color space. For a PCS, the CIE1976Lab, the CIE1931XYZ, or a subspace thereof is usually used. In the present embodiment, it is assumed that a PCS has media-relative Lab values where a white color of a sheet of paper is used as reference white color; however, a device-independent color space to be implemented is not necessarily limited to this.

The color management module 3 is principally made up of converting components: an RGB to PCS converting unit 4 that converts an RGB signal into a PCS signal, a CMYK to PCS converting unit 5 that converts a CMYK signal into a PCS signal, and a PCS to CMYK converting unit 6 that converts a PCS signal into a CMYK signal. Prior to processes performed by these converting components, the above-described color profiles that are color conversion parameters necessary for the conversion processes are set in these converting components. The color profiles are stored in databases (DBs) corresponding to their respective converting components, as described below.

A simulation profile DB 14 stores therein profiles (simulation profiles) for the RGB to PCS converting unit 4 and the CMYK to PCS converting unit 5. Prior to processes performed by the RGB to PCS converting unit 4 and the CMYK to PCS converting unit 5, the simulation profiles stored in the simulation profile DB 14 are set in the RGB to PCS converting unit 4 and the CMYK to PCS converting unit 5 in accordance with a user's selection through the user interface displayed on a console 18, as described below. If a profile is originally embedded in the original data 1, the embedded profile may be used in accordance with a user's selection through the user interface displayed on the console 18.

A base profile DB 15 stores therein profiles (base profiles) for the PCS to CMYK converting unit 6. Prior to a process performed by the PCS to CMYK converting unit 6, a base profile that is selected from the base profiles stored in the base profile DB 15 is set in the PCS to CMYK converting unit 6 in accordance with a user's selection through the user interface displayed on the console 18 or in accordance with automatic determination by means of a calibration that is described later. Thus, the PCS to CMYK converting unit 6 converts Lab values in the PCS into CMYK values substantially corresponding to Lab space color that is reproduced as an output image 11 formed though the processes performed by a sheet-corresponding correcting unit 7 and subsequent units.

Each of the sheet-corresponding correcting unit 7 and a tone correcting unit 8 corrects tone characteristics by using the one-dimensional LUTs (TRC) that are provided to correspond to C, M, Y, and K channels, respectively. The TRC used by the sheet-corresponding correcting unit 7 is a tone correction parameter (hereinafter, referred to as a sheet correction TRC) that is used in order to reduce differences in color reproduction characteristics among image formation media (hereinafter, simply referred to as a sheet) supported by the image forming apparatus 50. The sheet correction TRC is registered in a sheet correction TRC-DB 16. The TRC used by the tone correcting unit 8 is a tone correction parameter (hereinafter, referred to as tone correction data) that is used in order to adsorb a difference in tone characteristic depending on a tone processing parameter that is set in the tone processing unit 9. The tone correction data is registered in a tone processing parameter DB 17 so as to be associated with the tone processing parameter set in the tone processing unit 9.

According to the set tone processing parameter, the tone processing unit 9 converts an output value of each color output from the tone correcting unit 8, which is represented by 8 bits, into input data to be input to the image forming apparatus 50, which is represented by 2 bits per pixel, by making halftone dots (area modulation) each made up of a plurality of pixels.

The tone processing parameter DB 17 stores therein a pair of a tone processing parameter for each color to be set in the tone processing unit 9 and tone correction data to be set in the tone correcting unit 8. Prior to the process performed by the tone processing unit 9 and the tone correcting unit 8, according to a user's selection through the user interface displayed on the console 18, one of the pairs of the tone processing parameters and the tone correction data stored in the tone processing parameter DB 17 is selected. Then, the tone processing parameter is set in the tone processing unit 9, and the tone correction data is set in the tone correcting unit 8.

A profile management unit 13 stores therein a registration list in which an entry of the base profile DB 15 and an entry of the sheet correction TRC-DB 16 are associated with each other for each sheet. According to a user's selection through the user interface displayed on the console 18, the profile management unit 13 manages and sets the registration list and the profiles and TRC stored in the respective databases.

Upon a calibration, test image data (patch data) is sent from the profile management unit 13 to the tone correcting unit 8 and then output from the image forming apparatus 50. Output image 11 output at that time is a proof chart that contains a plurality of single color and mixed color patches formed on a sheet of paper (hereinafter, referred to as a user sheet) selected by a user as an image formation medium. The patches of the proof chart are subjected to color measurement by the color measuring unit 12 in response to a user's operation and then read by the profile management unit 13. The profile management unit 13 selects a base profile and a sheet correction TRC or calculates a new sheet correction TRC by using the read color measurement values and the existing entries of the base profile DB 15 and the sheet correction TRC-DB 16.

In the above description, a profile in each conversion component of the color management module 3 needs only a single-direction conversion parameter for conversion from an RGB or CMYK device color space to a PCS or for conversion in the opposite direction. However, at least a base profile includes a pair of conversion parameters for bidirectional conversion, and a profile for CMYK to PCS conversion is used for selection of the optimum profile and estimation of reproduction color error as described later. A profile for PCS to CMYK conversion is set in the PCS to CMYK converting unit 6 of the color management module 3. Thus, each entry of the base profile DB 15 includes one profile for CMYK to PCS conversion and a plurality of PCS to CMYK profiles corresponding to objects. The selection of the optimum entry from the base profile DB 15 and the selection of a sheet correction TRC or the calculation of a new sheet correction TRC as described above are performed using a profile for CMYK to PCS conversion included in each entry. The obtained TRC and the optimum entry are registered in the registration list of the profile management unit 13, which is described later, so as to be associated with each other (as needed), and the PCS to CMYK profiles included in the optimum entry are set in the PCS to CMYK converting units 6 that are changed depending on an object as described above. Thus, it is possible to correspond to color conversion suitable for the object.

In advance, sheet groups that are supported by the image forming apparatus 50 are grouped into a plurality of sheet groups that have similar color reproduction characteristics, and a profile representing the plurality of sheet groups is registered in an entry of the base profile DB 15. Broadly speaking, such sheet groups include groups of gloss sheets, matte sheets, regular sheets, and the like. The actual grouping is performed according to the actual color reproduction characteristics of the sheets.

Figure 3:
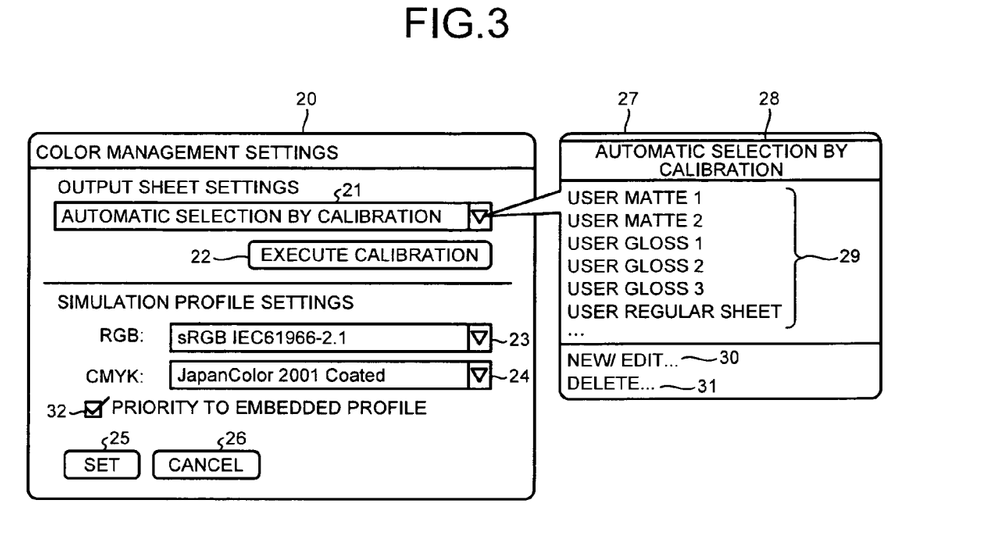
FIG. 3 illustrates an example of a color-management setting screen displayed as a user interface on a console of the color image processing apparatus according to the embodiment.

FIG. 3 illustrates an example of a color-management setting screen displayed as a user interface on the console 18 of the color image processing apparatus 41. A color-management setting screen 20 displays a pull-down menu 21, a calibration execution button 22, pull-down menus 23 and 24, a set button 25, a cancel button 26, and a check box 32.

Each of the pull-down menus 21, 23, and 24 of the color-management setting screen 20 corresponds to a user interface for selecting an element from elements stored in a corresponding of the DBs illustrated in FIG. 2. The pull-down menu 21 corresponds to the base profile DB 15 and the sheet correction TRC-DB 16. The pull-down menus 23 and 24 correspond to the simulation profile DB 14.

Options 27 that are displayed when the pull-down menu 21 is clicked include "automatic selection by calibration" 28, a registered list 29, a new/edit menu 30, and a deletion menu 31. The registered list 29 is a list that contains combinations of an entry of the base profile DB 15 and an entry of the sheet correction TRC-DB 16 for each sheet of paper that are already registered in the profile management unit 13, and a corresponding sheet name is assigned as a name of an entry. An explanation is given later of the details of the above operation. When either of the pull-down menus 23 and 24 is clicked, a registration list of a corresponding DB is displayed as a selection list.

If the check box 32 is checked and a profile is embedded in the original data 1 illustrated in FIG. 2, the settings of the pull-down menus 23 and 24 are disregarded and, instead, the embedded profile is used as a set parameter for the RGB to PCS converting unit 4 or the CMYK to PCS converting unit 5.

Figure 4:
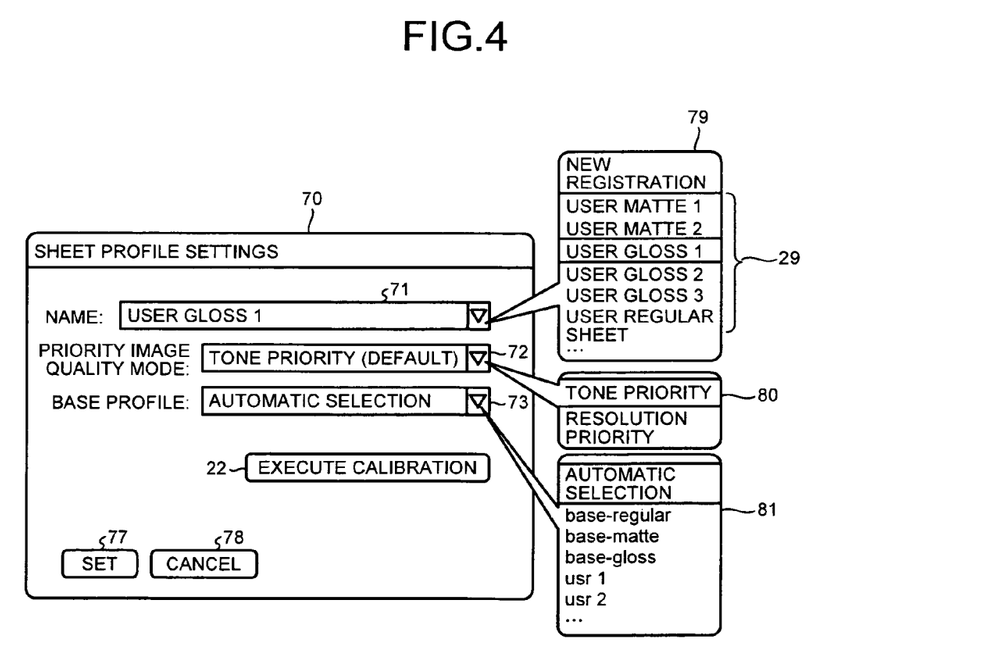
FIG. 4 illustrates an example of a sheet-profile setting screen that is displayed when a new/edit menu is selected on the color-management setting screen illustrated in FIG. 3.

FIG. 4 illustrates an example of a sheet-profile setting screen 70 that is displayed when the new/edit menu 30 is selected from the options 27 of the pull-down menu 21 illustrated in FIG. 3. The sheet-profile setting screen 70 displays pull-down menus 71, 72, and 73, a calibration execution button 22, a set button 77, and a cancel button 78.

If the pull-down menu 71 of the sheet-profile setting screen 70 is clicked, a new registration menu 79 and a registered list 29 are displayed. The user selects a registered name that is a target to be edited from the registered list 29 or selects the new registration menu 79 to register a new name in the list.

If the pull-down menu 72 is clicked, a mode menu 80 is displayed. Each item of the mode menu 80 is related to a tone processing parameter that is set in the tone processing unit 9 and the tone correction data (TRC) that is set in the tone correcting unit 8, both of which are registered in the tone processing parameter DB 17. "Tone priority", a parameter suitable for photo images with emphasis on tone, or "resolution priority", a parameter suitable for characters and line images with emphasis on resolution, is set in the tone processing unit 9. At the same time, the tone correction data (TRC) corresponding to the set parameter is set in the tone correcting unit 8. These set values are applied to the above-described proof chart that is output when a calibration is performed.

The pull-down menu 73 is a user interface used for selecting and designating a profile that is pre-registered in the base profile DB 15. When the pull-down menu 73 is clicked, a base-profile selection menu 81 is displayed. If the user selects, in particular, "automatic selection" from the base-profile selection menu 81, the optimum base profile is automatically selected when a calibration is performed.

If the pull-down menu 71 is clicked and then the registered entry is selected from the registered list 29, the items related to the name of the selected entry are selected in the displays of the pull-down menu 72 and the pull-down menu 73. If the new registration menu 79 is selected, the tone priority and the automatic selection of a base profile are selected as default values.

The calibration execution button 22 is a user interface that is clicked by the user to order the execution of calibration.

Figure 5:
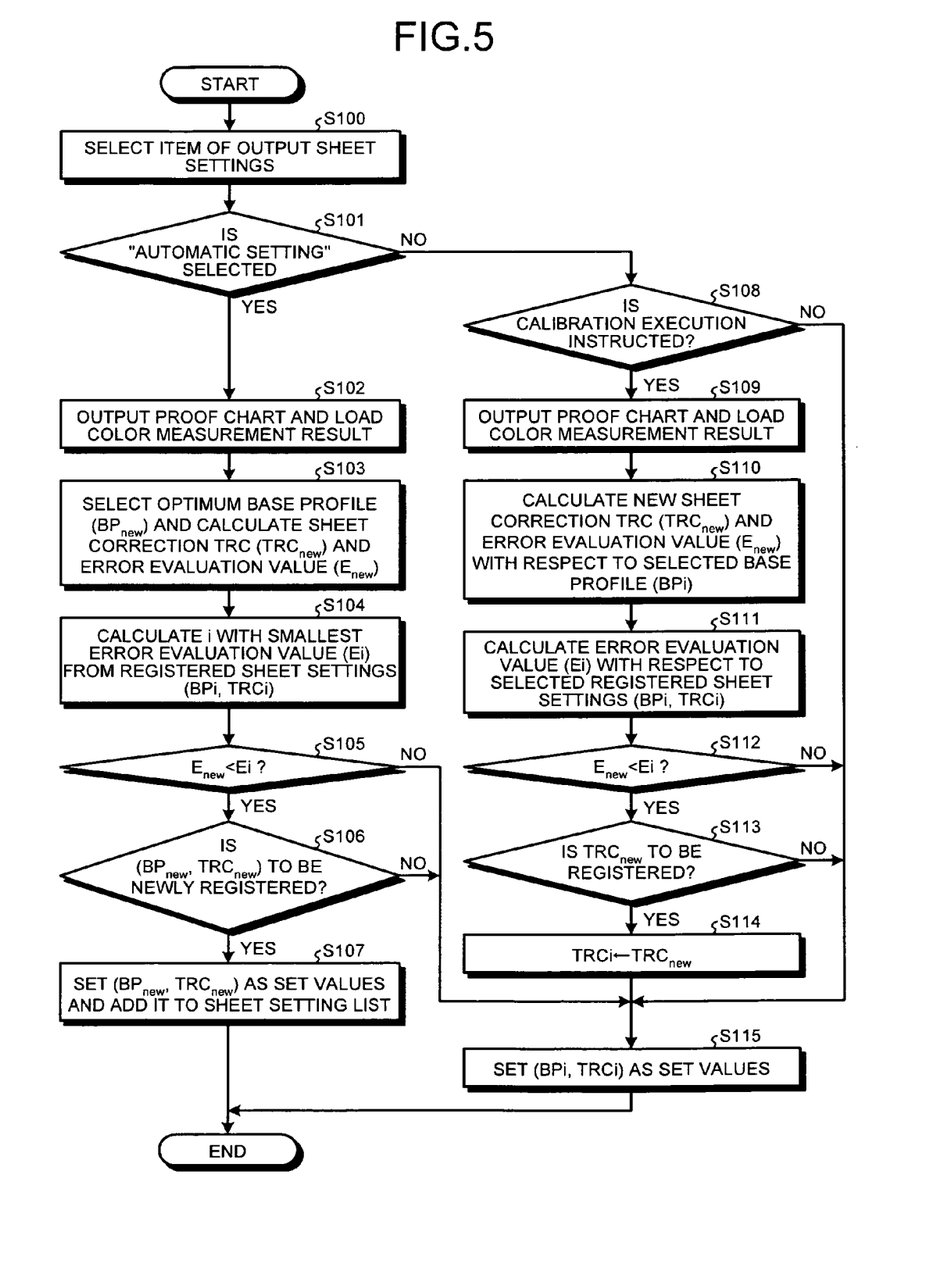
FIG. 5 is a flowchart that illustrates the continuous flow of a color management process performed by the color image processing apparatus according to the embodiment.

A detailed explanation is given below, with reference to the flowchart illustrated in FIG. 5, of the continuous flow of the color management process performed by the profile management unit 13 of the color image processing apparatus 41 according to the present embodiment.

First, at Step S100, when the user selects any item of the options 27 of the pull-down menu 21 on the color-management setting screen 20 illustrated in FIG. 3, it is determined at Step S101 whether the item selected by the user is "automatic selection by calibration" 28. When "automatic selection by calibration" is selected, the process proceeds to Step S102. When the entry that is already registered in the profile management unit 13 is selected from the registered list 29, the process proceeds to Step S108. An explanation is omitted here for the operation when a different button, i.e., the new/edit menu 30 or the deletion menu 31 is selected.

At Step S102, after the user clicks the calibration execution button 22, the user is guided, through the console 18, to proceed to the output of a proof chart and the color measurement of the output proof chart using the color measuring unit 12. Accordingly, the user sets a user sheet to be used so that a proof chart is output and sets the output proof chart (the output image 11) in the color measuring unit 12 so that the color measurement is performed. If the set button 25 is clicked even though the calibration has not been performed, an alert is issued to the user to notify him/her that the calibration has not been performed, and then the user is prompted to select any of execution and cancellation of calibration and restart (not illustrated) from Step S100.

Next, at Step S103, the optimum base profile ($BP_{new}$) that has the color reproduction characteristics closest to the obtained color measurement value characteristics is selected from the registered profiles in the base profile DB 15 by using the method described later. At the same time, a sheet correction TRC ($TRC_{new}$) for each of colors C, M, Y, and K that has a best approximation to the output color reproduction characteristics in combination with the optimum base profile ($BP_{new}$) is calculated, and an error evaluation value ($E_{new}$) when the sheet correction TRC ($TRC_{new}$) is used is calculated.

At Step S104, with respect to a base profile set value BP and a sheet correction TRC of each entry in the registered list of the profile management unit 13, an error evaluation value E is calculated, which is obtained when the base profile set value BP and the sheet correction TRC are used, and an entry (BPi, TRCi) for which E is the smallest value Ei is selected.

At Step S105, the error evaluation value ($E_{new}$) calculated at Step S103 is compared to the smallest value Ei of the error evaluation value obtained when a base profile and a sheet correction TRC of each entry in the registered list are used. If $E_{new}$<Ei, the process proceeds to Step S106 and, if not, the process proceeds to Step S115.

At Step S106, a dialog box is displayed on the console 18 (not illustrated) to prompt for an instruction as to whether a combination of the optimum base profile ($BP_{new}$) selected at Step S103 and the generated sheet correction TRC ($TRC_{new}$) is to be newly registered. If the user orders the new registration, the process proceeds to Step S107 and, if not, the process proceeds to Step S115.

At Step S107, the sheet correction TRC ($TRC_{new}$) generated at Step S103 is registered in the sheet correction TRC-DB 16, a name is assigned to a link to ($BP_{new}$, $TRC_{new}$) and added to the registration list of the profile management unit 13, and $BP_{new}$ and $TRC_{new}$ are set in the PCS to CMYK converting unit 6 and the sheet-corresponding correcting unit 7, respectively, and then the process is complete.

When it is determined that the entry that is already registered in the profile management unit 13 is selected from the registered list 29 and the process proceeds to Step S108, it is determined at Step S108 whether the calibration execution button 22 is clicked by the user. When the calibration execution button 22 is clicked, the process proceeds to Step S109 and uses the base profile BPi and the sheet correction TRC TRCi of the selected entry. When the calibration execution button 22 is not clicked, the process proceeds to Step S115 and uses the base profile BPi and the sheet correction TRC TRCi of the selected entry.

At Step S109, the user is guided, through the console 18, to proceed to the output of a proof chart and the color measurement of the output proof chart using the color measuring unit 12. Accordingly, the user sets a user sheet to be used so that a proof chart is output and sets the output proof chart (the output image 11) in the color measuring unit 12 so that the color measurement is performed.

At Step S110, a sheet correction TRC ($TRC_{new}$) with the smallest error evaluation value ($E_{new}$) is newly calculated with respect to the base profile BPi of the entry selected at Step S101.

At Step S111, the error evaluation value Ei is calculated, which is obtained when the base profile (BPi) and the sheet correction TRC (TRCi) of the entry selected at Step S101 are used.

At Step S112, the error evaluation value ($E_{new}$) obtained when the sheet correction TRC ($TRC_{new}$) calculated at Step S110 is used is compared to the error evaluation value Ei obtained when the registered sheet correction TRC (TRCi) calculated at Step S111 is used. If $E_{new}$<Ei, the process proceeds to Step S113 and, if not, the process proceeds to Step S115.

At Step S113, a dialog box is displayed on the console 18 (not illustrated) to prompt for an instruction as to whether the sheet correction TRC ($TRC_{new}$) calculated at Step S110 is to be newly registered. If the user orders the new registration, the process proceeds to Step S114 and, if not, the process proceeds to Step S115.

At Step S114, the sheet correction TRC ($TRC_{new}$) calculated at Step S110 is registered in the sheet correction TRC-DB 16, and TRCi of the selected entry (BPi, TRCi) in the registration list of the profile management unit 13 is replaced by $TRC_{new}$.

At Step S115, BPi and TRCi are set in the PCS to CMYK converting unit 6 and the sheet-corresponding correcting unit 7, respectively, and the process is complete. Here, at Step S107 and Step S114, the base profile $BP_{new}$ in the entry ($BP_{new}$ and $TRC_{new}$) that is added to the registration list of the profile management unit 13 in relation to the sheet correction TRC ($TRC_{new}$) includes, as described above, one profile for CMYK to PCS conversion and one or a plurality of PCS to CMYK profiles to deal with the above-described change for each object.

Figure 6:
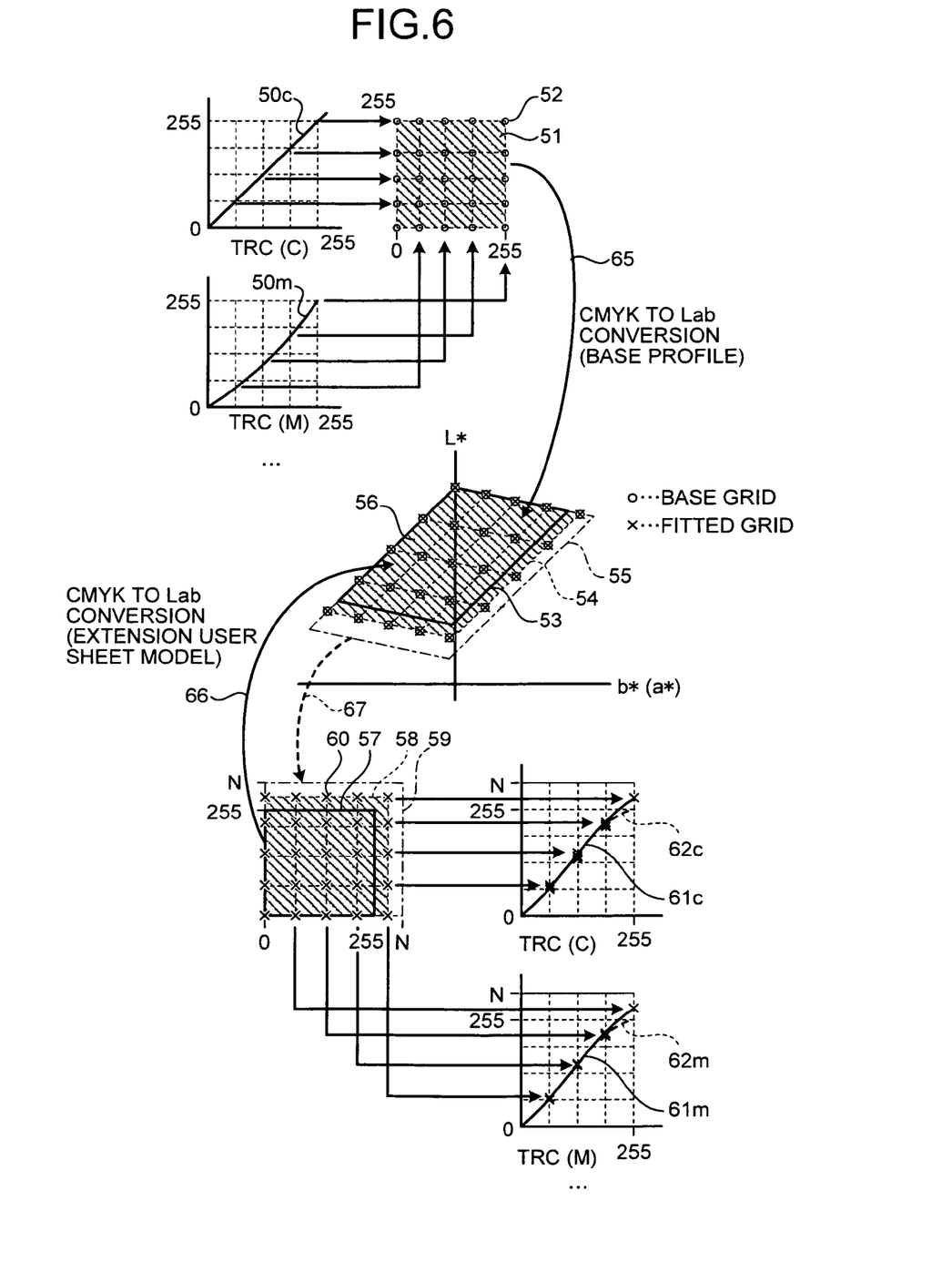
FIG. 6 is a conceptual diagram that illustrates a method of constructing a sheet correction TRC with the smallest error evaluation value for sheet characteristics with respect to a base profile.

FIG. 6 is a conceptual diagram that illustrates a method of constructing a sheet correction TRC with the smallest error evaluation value for the sheet characteristics with respect to a base profile. A detailed explanation is given below of the specific example of the method of constructing a sheet correction TRC with reference to FIG. 6.

For the output of a proof chart upon a calibration, a specific tone processing parameter (screen set) that is the standard for calibration and its corresponding tone correction data (TRC) are set in the tone processing unit 9 and the tone correcting unit 8 from the tone processing parameter DB 17. At that time, the tone correction data (TRC) set in the tone correcting unit 8 is corrected such that the tone characteristics of the CMYK basic colors until image outputting process including processes in the tone correcting unit 8 and subsequent units become nearly the predefined characteristics without regard to the tone processing parameter set in the tone processing unit 9. In FIG. 6, tone correction data (TRC) for cyan is represented by a curve 50$c$, and tone correction data (TRC) for magenta by a curve 50$m$. Because the same holds for yellow and black, the illustrations of tone correction data (TRC) for yellow and black are omitted in FIG. 6.

Grid points 52 of a CMYK space 51 are grid points that are obtained by a combination of six input values x=0, 51, 102, 153, 204, 255 for each channel of C, M, Y, and K on which tone correction has been performed (to make the illustration simple in FIG. 6, two-dimensional grid points of 5×5 are illustrated in a simple manner on a conceptual basis; however, four-dimensional grid points of 6×6×6×6 are obtained in actuality). These grid points are converted into grid points on a Lab space 56 by CMYK to PCS conversion 65 using a base profile, and the grid points are determined as target grid points. The tone correction data (TRC) such as the curves 50$c$ and 50$m$ for each color that is set in the tone correcting unit 8 is pre-defined for each tone processing parameter such that the target grid points are nearly uniformly distributed on the Lab space 56. In actuality, such tone correction data (TRC) is configured by defining a TRC for each color such that a color difference of each of colors C, M, Y, and K using white as a reference shows linearity with respect to an input tone value for each tone processing parameter setup condition (normally the number of halftone dot lines) for a regular sheet of each base profile.

The proof chart output when the calibration is performed is patch data that is directly fed from the profile management unit 13 as CMYK input for the tone correcting unit 8, and it is the output image 11 that includes patches in 6×6×6×6 colors reproduced by the image forming apparatus 50 in the combination of C, M, Y, K=0, 51, 102, 153, 204, 255.

The profile management unit 13 configures a CMYK to PCS conversion model 66 with respect to any CMYK input for a user sheet by using Lab values that are obtained by relativizing the patch color measurement values and by performing multilinear interpolation calculation. The CMYK to PCS conversion model 66 is a model of color reproduction characteristics for the tone correcting unit 8 and subsequent units illustrated in FIG. 2 and, if a reproduction color gamut 53 for a user sheet is narrower than a color gamut 54 of a base profile, an extended color gamut 55 is extended by extrapolation such that it becomes wider than the base profile color gamut 54. For this expansion, a space 58 that is obtained by representing an input CMYK space 57 of the CMYK to PCS conversion model 66 for a user sheet using an 8-bit integer value of 0 to 255 for each color is expanded to an extended CMYK space 59 in the range of 0 to N (256≤N<512) for each color, and an extrapolation is performed on an area where a C, M, Y, K input range exceeds 255 by using an interpolation function (interpolation function that is applied to an CMYK value obtained by replacing a value that exceeds 255 with 255) for an adjacent area. The above extension range N is a value that is defined by a previously experimentally obtained value so as to cover a solid variation range according to a sheet difference.

Next, for each element of CMYK grid points {(c, m, y, k)|c, m, y, k=0, 51, 102, 153, 204, 255}, with respect to an output Lab value Lab$_m$ (c, m, y, k) of the extended CMYK to PCS conversion model 66 (67) and a Lab value Lab$_t$ of the target grid point that is set using the base profile, the profile management unit 13 determines c', m', y' by which $\Delta E^2$=(Lab$_m$ (c', m', y', k)−Lab$_t$)$^2$ is the smallest and sets (c', m', y')=(c, m, y) as a default value. In the above description, a value k for K is treated as a fixed value so as to confirm flexibility with a Lab space.

The adjusted CMYK grid point 60 that is obtained as described above is projected to each C, M, Y channel, and least square fitting is performed using a cubic polynomial function, starting from the origin, by using the input grid point values {0, 51, 102, 153, 204, 255} in the horizontal axis and the corresponding projected adjusted values in the vertical axis so that correction curves 61$c$, 61$m$, and 61$y$ (the illustration of the correction curve 61$y$ is omitted in FIG. 6) for respective colors are obtained. Because these correction curves may be out of the range of 0 to 255 due to color gamut extension, a reduction process is performed as described later so that sheet correction TRC 62$c$, 62$m$, and 62$y$ (the illustration of the sheet correction TRC 62$y$ is omitted in FIG. 6) in the range of 0 to 255 can be obtained.

Finally, an average color difference between a CMYK grid point and a Lab value (Lab$_t$) of a target grid point is calculated with respect to the combination of the obtained sheet correction TRC of each of colors C, M, and Y and the CMYK to PCS conversion model 66 for a user sheet, and the calculated average color difference is determined as an error evaluation value.

The reduction process includes, for example, a method described below: the correction curves 61$c$, 61$m$, and 61$y$ for C, M, and Y are determined as TRC$_C$, TRC$_M$, TRC$_Y$; $x_{max}$=max{x|TRC$_C$(x)≤255, TRC$_M$(x)≤255, TRC$_Y$(x)≤255}; the values corresponding to the C, M, Y input values 255 are determined as TRC$_C$($x_{max}$), TRC$_M$($x_{max}$), TRC$_Y$($x_{max}$); and with respect to TRC$_C$, the point ($x_1$, 230) where TRC$_C$($x_1$)= 230 is connected to (255, TRC$_C$($x_{max}$)) in a smooth manner with a quadric curve.

In the above example, the input CMYK space is divided using the grid points of 6×6×6×6; however, the decrease in the number of divisions for K is effective for the reduction in the number of the color measurement patches. For example, the number of division grid points is set to four for only K so that the total number of patches can be set to 6×6×6×4=864 patches that can be output adequately on about one A4-size sheet. If there is no problem about the decrease in precision, it is easy to further reduce the number of CMY grid points so that the number of patches can be smaller.

As described above, the color reproduction characteristics in accordance with a calibration-target sheet and a tone processing setup condition are approximately matches the reproduced color obtained by PCS to CMYK conversion using a selected base profile. For device-link type conversion, such as RBB to CMYK conversion by the combination of the RGB to PCS converting unit 4 and the PCS to CMYK converting unit 6 both illustrated in FIG. 2 or CMYK to CMYK conversion by the combination of the CMYK to PCS converting unit 5 and the PCS to CMYK converting unit 6, a similar system can be implemented in an easy manner if a profile is stored in an entry of the base profile DB 15 associated with a CMYK to PCS profile.

A detailed explanation is given above using a specific example. In the color image processing apparatus 41 according to the present embodiment, the reproduced color of the image forming apparatus 50, when an unknown image recording medium such as a user sheet is used, is approximated to the reproduced color obtained by PCS to CMYK conversion using a base profile that is selected from a plurality of base profiles pre-registered in the base profile DB 15. Thus, it is possible to achieve consistency of reproduced colors and to reduce the essentially required number of profiles with respect to the required number of types of sheets. Furthermore, the user's operation can be simplified to the same operation as calibration.

Furthermore, the profile management unit 13 registers a selected base profile and a generated sheet correction TRC in a list such that they are related to each other, and the user interface displayed on the console 18 allows a user to select from a registered list so that a setting operation corresponding to an image recording medium can be facilitated in a case where calibration is unnecessary.

Moreover, the RIP 2 develops the original data 1 into a bitmap in which attribute information is added to color signals for each pixel in RGB or CMYK and inputs it to the color management module 3. The profile management unit 13 includes one profile for CMYK to PCS conversion and a plurality of profiles for PCS to CMYK in each entry of the base profile DB 15, determines the optimum entry by CMYK to PCS, generates a sheet correction TRC, sets PSC to CMYK profiles of the same entry in the PCS to CMYK converting units 6 that are changed depending on an object as described above so that it is possible to switch the optimum color conversion depending on image attribute such as a characters, line image, or photo image and, at the same time, perform the optimum color conversion according to a variety of image formation media.

The sheet-corresponding correcting unit 7 that performs tone correction to absorb a difference between sheets of paper used in the image forming apparatus 50 is arranged separately from the tone correcting unit 8 that absorbs a difference in tone characteristic depending on a tone processing parameter that is set in the tone processing unit 9; therefore, it is possible to perform a tone process according to image attributes such as a character, line image, or photo image at the same time.

Further, the profile management unit 13 configures the CMYK to PCS conversion model 66 for a user sheet with respect to any CMYK input by using a Lab value that is obtained by relativizing a patch color measurement value and by performing multilinear interpolation calculation and extends the input range of a converting unit to the higher concentration side using the CMYK to PCS conversion model 66 by extrapolation, selects a profile for CMYK to PCS conversion that has a best approximation to the characteristic value of the CMYK to PCS conversion model 66 from the entries of the base profile DB 15 as a profile to be used for conversion in the CMYK to PCS converting unit 5, and generates a sheet correction TRC that has a best approximation to the output characteristics of the CMYK to PCS converting unit 5 with respect to the selected profile by using the CMYK to PCS conversion model 66 so that, even if the color gamut obtained when a new user sheet is used is narrower than a color gamut obtained by a base profile, it is possible to perform correction so as to have, using a base profile, an approximation to the reproduction color characteristics of the image forming apparatus 50 obtained when a new user sheet is used. Thus, it is not necessary to set the characteristics of a base profile to the minimum color gamut with respect to a sheet group represented by the base profile; therefore, it is possible to prevent the color gamut from being small due to shared use of profiles.

An image processing program that is mounted as expansion software on the above-described control PC is executed by a CPU of the control PC so that an image processing process is performed by the color image processing apparatus 41 according to the present embodiment as described above. An image processing program to be executed by the CPU of the control PC is provided such that, for example, it is installed in a ROM, or the like, of the control PC in advance. Furthermore, a configuration may be such that an image processing program to be executed by the CPU of the control PC is provided by being stored, in the form of a file that is installable and executable, in a recording medium readable by a computer, such as a CD-ROM, a flexible disk (FD), a CD-R, or a Digital Versatile Disk (DVD). Further, a configuration may be such that an image processing program to be executed by the CPU of the control PC is stored in a computer connected via a network such as the Internet and provided by being downloaded via the network. Moreover, a configuration may be such that an output control program to be executed by the CPU of the control PC is provided or distributed via a network such as the Internet.

An image processing program to be executed by the CPU of the control PC has a module configuration including each processing function illustrated in the functional block diagram of FIG. 2 and, in actual hardware, a CPU (processor) reads the image processing program from, for example, the ROM and executes the read program so as to load each processing function into a main storage (RAM) so that each processing function is generated in the main storage.

According to an aspect of the present invention, a reproduced color of an image forming apparatus obtained when using an image recording medium with unknown characteristics is approximated by color conversion and tone correction using a color conversion parameter that is selected from a plurality of pre-registered color conversion parameters so that the consistency of reproduced colors can be achieved; therefore, an advantage is produced such that color management can be performed in a simple manner on an image recording medium with unknown characteristics without configuring a color conversion parameter for which high-level technical experience is needed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that performs image processing to achieve uniform color reproduction on various types of image formation media by an image forming apparatus, wherein the image forming apparatus forms a color image on an image formation medium by superimposing a plurality of basic colors, the image processing apparatus comprising:
a database that stores therein a plurality of color conversion parameters;
a color converting unit that converts, by using a color conversion parameter that is selected from the plurality of color conversion parameters stored in the database, either device-dependent color values of another device different from the image forming apparatus or device-independent color values into color values that correspond to basic colors of the image forming apparatus;

a medium-corresponding correcting unit that corrects, by using a tone correction parameter, tone characteristics of the respective basic colors of the image forming apparatus to correspond with an image formation medium to be used by the image forming apparatus; and a user interface that receives a user's operation that instructs a calibration to start, wherein through the calibration started according to the user's operation by using the user interface, the color conversion parameter to be used by the color converting unit is automatically selected from the plurality of color conversion parameters stored in the database, and the tone correction parameter to be used by the medium-corresponding correcting unit is generated.

2. The image processing apparatus according to claim 1, further comprising:

a proof-chart output control unit that causes the image forming apparatus to output a proof chart that is made up of a plurality of patches formed on an image formation medium;

a color measuring unit that measures colors of the patches on the proof chart output from the image forming apparatus; and a parameter managing unit that selects, from the plurality of color conversion parameters stored in the database, a color conversion parameter that has color reproduction characteristics closest to color measurement values of the patches measured by the color measuring unit and that generates a tone correction parameter that has an approximation to the color measurement values of the patches when the selected color conversion parameter is used, wherein the color converting unit converts, by using the color conversion parameter selected by the parameter managing unit, either the device-dependent color values of another device different from the image forming apparatus or the device-independent color values into the color values that correspond to the basic colors of the image forming apparatus, and the medium-corresponding correcting unit corrects, by using the tone correction parameter generated by the parameter managing unit, the tone characteristics of the respective basic colors of the image forming apparatus to correspond with an image formation medium to be used by the image forming apparatus.

3. The image processing apparatus according to claim 2, wherein the parameter managing unit has a function of registering the selected color conversion parameter and the generated tone correction parameter associated with each other.

4. The image processing apparatus according to claim 2, further comprising an image input unit that inputs, to the color converting unit, image data to which an attribute value is added besides color information on a pixel by pixel basis, wherein the parameter managing unit has a function of registering the generated tone correction parameter so as to be associated with the plurality of color conversion parameters, and the color converting unit uses the plurality of color conversion parameters registered associated with the tone correction parameter by the parameter managing unit while changing the plurality of color conversion parameters depending on the attribute value per pixel of the image data.

5. The image processing apparatus according to claim 4, further comprising:

a tone processing unit that convert, by using the tone processing parameter, a pixel signal of each basic color to be output to the image forming apparatus from a pixel signal with a large number of bits into a pixel signal with a small number of bits through area modulation, and a tone correcting unit that corrects, by using a second tone correction parameter that is different from the tone correction parameter used by the medium-corresponding correcting unit, the tone characteristics of the respective basic colors of the image forming apparatus that are changed according to a difference of the tone processing parameter used by the tone processing unit, wherein the tone processing unit changes, for each pixel, the tone processing parameter to be used, depending on the attribute value per pixel of the image data input from the input unit to the color converting unit, and the tone correcting unit changes the second tone correction parameter to be used in accordance with the change of the tone processing parameter used by the tone processing unit.

6. The image processing apparatus according to claim 2, further comprising:

an extension converting unit that converts color values corresponding to basic colors of the image forming apparatus into device-independent color values in accordance with color measurement characteristic values of the patches measured by the color measuring unit and extends its input range to a higher concentration side by means of extrapolation, wherein the color converting unit includes a first color converting unit that converts, by using a first color conversion parameter, color values corresponding to the respective basic colors of the image forming apparatus into device-independent color values and includes a second color converting unit that converts, by using a second color conversion parameter, device-independent color values into color values corresponding to the respective basic colors of the image forming apparatus, the database stores therein, as the plurality of color conversion parameters, a plurality of combinations of the first color conversion parameters and the second color conversion parameters that have correspondence relations, the parameter managing unit selects, as a first color conversion parameter to be used by the first color converting unit, a first color conversion parameter that has a best approximation to a characteristic value of the extension color converting unit from a plurality of first color conversion parameters stored in the database and, generates a tone correction parameter that has, using the extension color converting unit, a best approximation to output characteristics of the first color converting unit with respect to the selected first color conversion parameter, and selects, as a second color conversion parameter to be used by the second color converting unit, a second conversion parameter stored in the database corresponding to the selected first color conversion parameter.

7. A method of image processing performed to achieve uniform color reproduction on various types of image formation media by an image forming apparatus, wherein the image forming apparatus forms a color image on an image formation medium by superimposing a plurality of basic colors, the method comprising:

causing the image forming apparatus to output a proof chart that is made up of a plurality of patches formed on an image formation medium;

measuring colors of the patches on the proof chart output from the image forming apparatus;

selecting, from a plurality of color conversion parameters pre-stored in a database, a color conversion parameter that has color reproduction characteristics closest to color measurement values of the measured patches;

generating a tone correction parameter that has an approximation to the color measurement values of the patches when the selected color conversion parameter is used;

converting, by using the selected color conversion parameter, either device-dependent color values of another device different from the image forming apparatus or device-independent color values into color values that correspond to basic colors of the image forming apparatus; and     correcting, by using the generated tone correction parameter, tone characteristics of the respective basic colors of the image forming apparatus to correspond with an image formation medium to be used by the image forming apparatus.

8. A computer program product comprising a non-transitory computer-readable medium having computer-readable program codes embodied in the medium for image processing performed to achieve uniform color reproduction on various types of image formation media by an image forming apparatus, wherein the image forming apparatus forms a color image on an image formation medium by superimposing a plurality of basic colors, the program codes when executed causing a computer to execute:

causing the image forming apparatus to output a proof chart that is made up of a plurality of patches formed on an image formation medium;

measuring colors of the patches on the proof chart output from the image forming apparatus;

selecting, from a plurality of color conversion parameters pre-stored in a database, a color conversion parameter that has color reproduction characteristics closest to color measurement characteristic values of the measured patches;

generating a tone correction parameter that has an approximation to the color measurement values of the patches when the selected color conversion parameter is used;

converting, by using the selected color conversion parameter, either device-dependent color values of another device different from the image forming apparatus or device-independent color values into color values that correspond to basic colors of the image forming apparatus; and     correcting, by using the generated tone correction parameter, tone characteristics of the respective basic colors of the image forming apparatus to correspond with an image formation medium to be used by the image forming apparatus.

\* \* \* \* \*